United States Patent [19]

Streit

[11] 4,065,994

[45] Jan. 3, 1978

[54] MUSICAL INSTRUMENT SUPPORT STAND

[76] Inventor: James L. Streit, Rte. 3, Box 364, Vernon, Tex. 76384

[21] Appl. No.: 669,408

[22] Filed: Mar. 22, 1976

Related U.S. Application Data

[63] Continuation of Ser. No. 482,352, June 24, 1974, abandoned.

[51] Int. Cl.$^2$ .............. G10G 5/00; A47G 29/00; A47C 7/62
[52] U.S. Cl. .................................... 84/453; 84/327; 248/123; 297/186
[58] Field of Search .............. 84/453, 327; 248/123, 248/122, 121, 284; 297/186

[56] References Cited

U.S. PATENT DOCUMENTS

| | | | |
|---|---|---|---|
| 316,459 | 4/1885 | How | 248/280 |
| 806,790 | 12/1905 | Foersterling | 248/281 |
| 1,285,025 | 11/1918 | Burns | 248/280 |
| 1,319,792 | 10/1919 | Phorson | 248/123 |
| 1,570,168 | 1/1926 | Mortensen | 84/453 |
| 1,653,772 | 12/1927 | Knoche | 84/453 |
| 2,171,028 | 8/1939 | Gelb | 248/123 |

FOREIGN PATENT DOCUMENTS 562,676  12/1957  Belgium .................... 248/123

Primary Examiner—Stephen J. Tomsky
Attorney, Agent, or Firm—Wayland D. Keith

[57] ABSTRACT

A stand for supporting a musical instrument, such as a sousaphone, tuba horn or other large instrument, in playing position for use by children too small to normally handle such instruments. The stand has an upright standard with a parallelogram mechanism mounted near the upper end thereof, which mechanism is spring tensioned to counter-balance the weight of the horn or other instrument placed thereon, so that the horn may be raised and lowered substantially, with a minimum of effort on the part of the player, thereby enabling the horn, if it is a Sousaphone, to be brought into position around a musician who may be seated in a chair. If the horn is a tuba, it may be conveniently positioned in front of the musician. Regulating mechanism is provided to properly tension the spring to counterbalance horns having different weights. Horn engaging mechanisms are provided to engage the horn and hold it in playing position. A crank mechanism is provided to properly tilt the musical instrument to the proper degree so the instrument will occupy the proper position.

9 Claims, 11 Drawing Figures

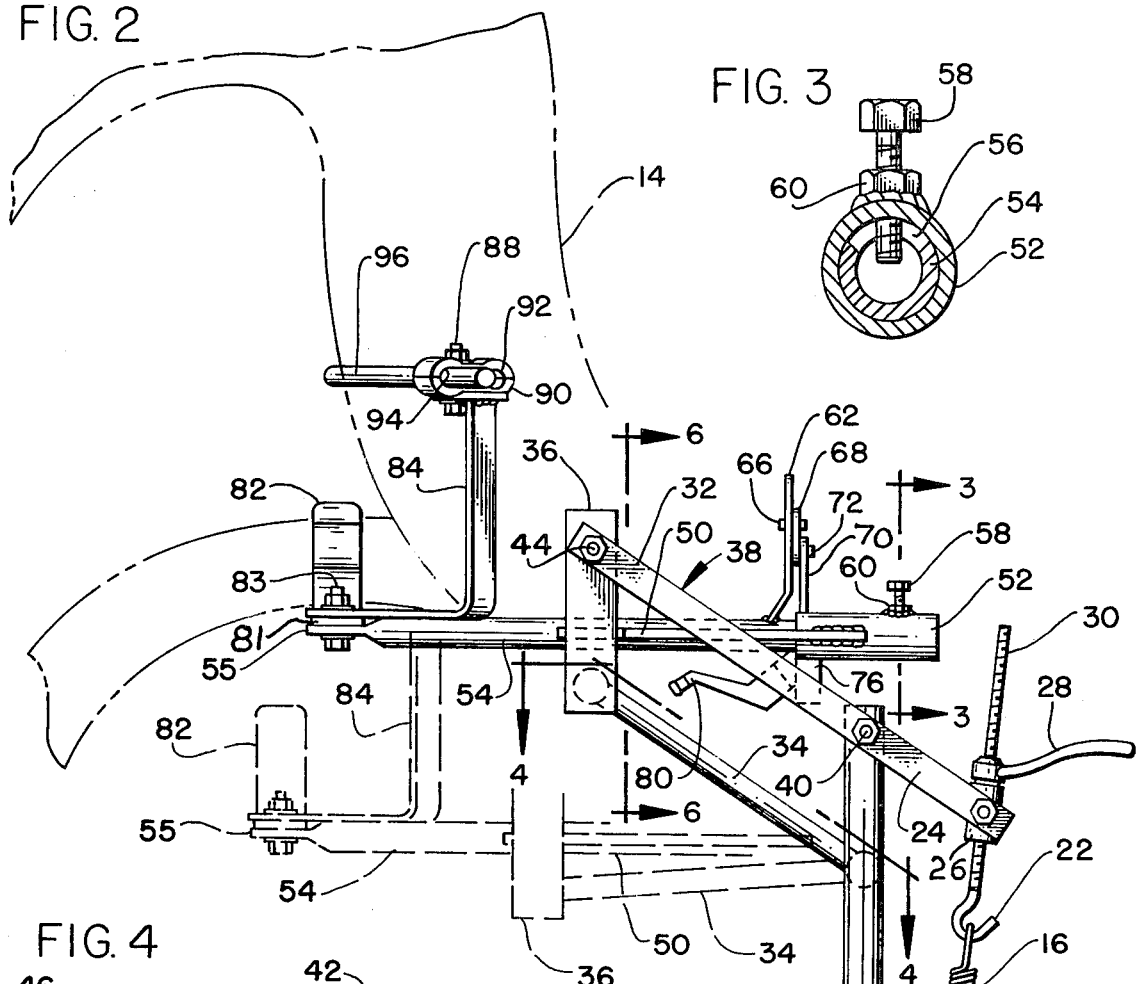
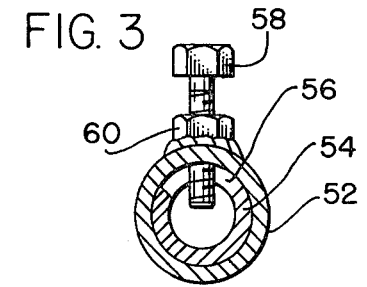
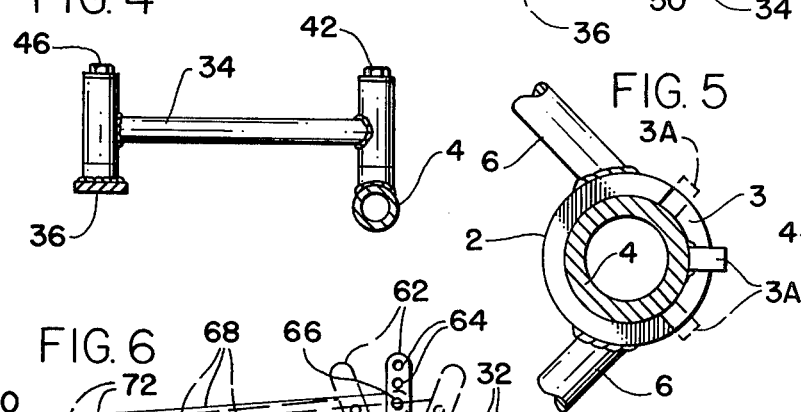
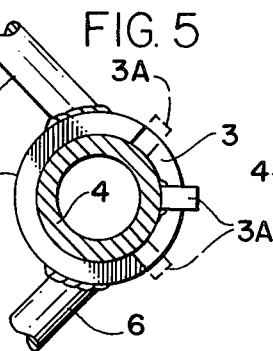

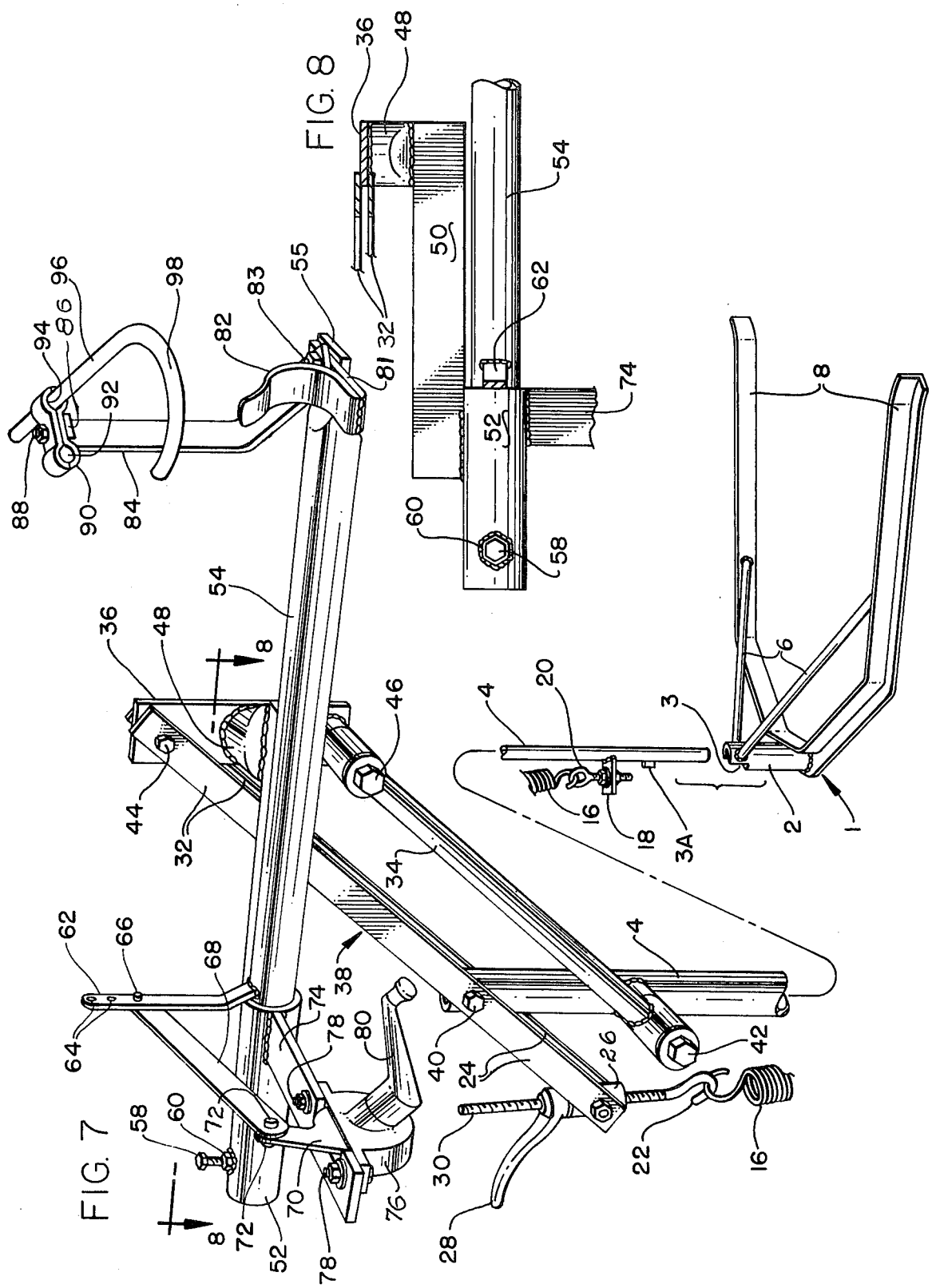

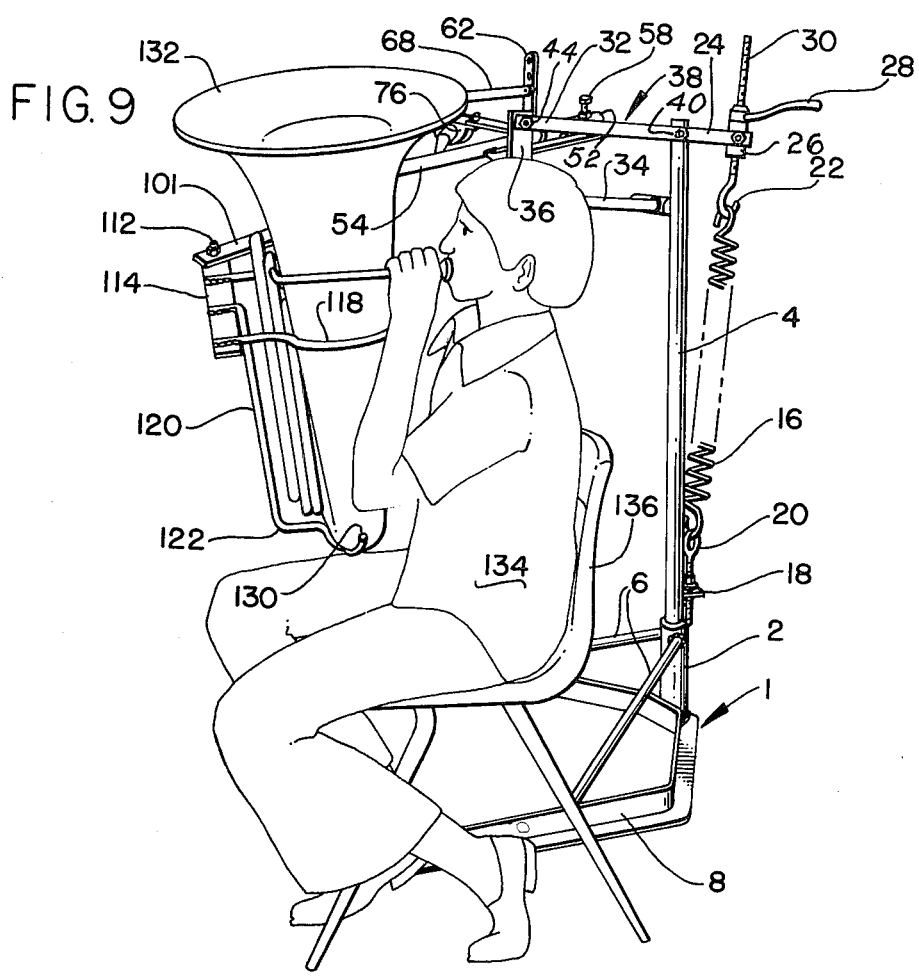
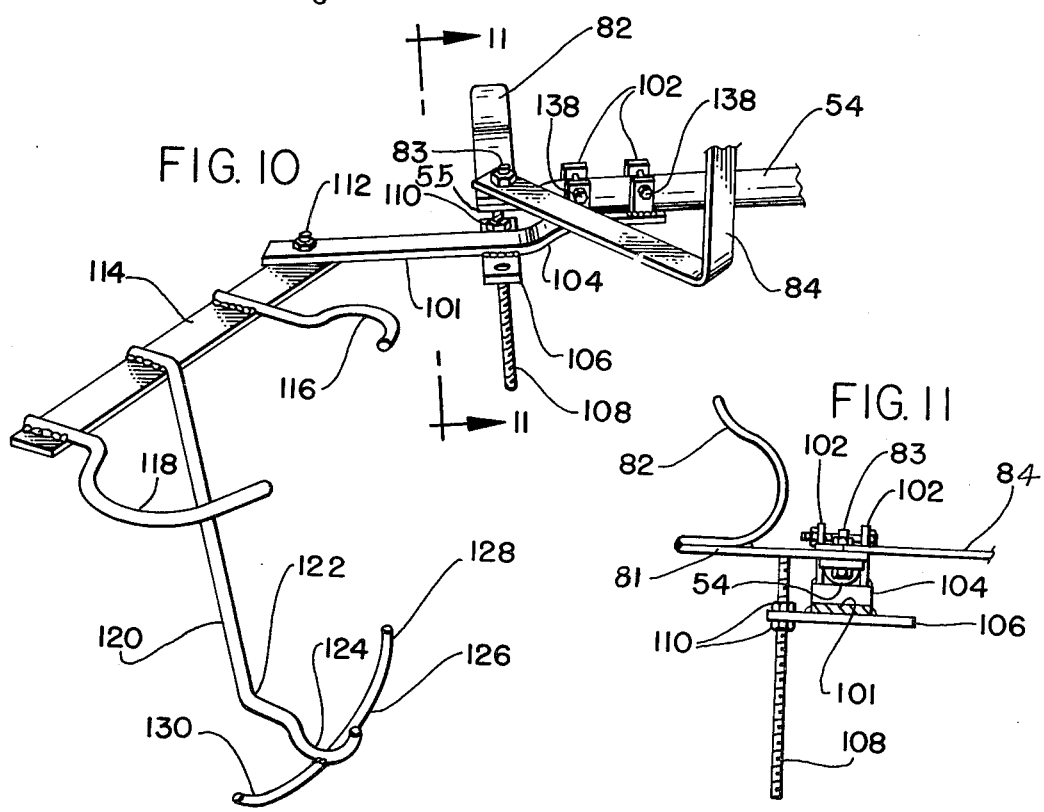

MUSICAL INSTRUMENT SUPPORT STAND

This application is a continuation of application Ser. No. 482,352, filed June 24, 1974, for MUSICAL INSTRUMENT SUPPORT STAND, now abandoned, and is also co-pending with application Ser. No. 638,164, filed Dec. 9, 1975, for MUSICAL INSTRUMENT SUPPORT STAND WITH COUNTERBALANCED, VERTICALLY MOVABLE HORN SUPPORT RACK.

This invention relates to a musical instrument stand, which stand may be disassembled from the base for ready storage or transportation, and which may be readily reassembled for use without the use of tools.

This particular stand enables a relatively small child to use a large instrument, even though the child cannot lift the instrument, when seated in position to play, and to play the instrument with the ease and adeptness of an adult player. The spring tension adjusting mechanism is so constructed that, when taken with the parallelogram mechanism, enables the horn or other instrument to be raised a substantial distance in a vertical plane, which enables the performer, who has been surrounded by the horn, such as a sousaphone, to be free of encumbrance and is able to raise from the seated position without interference from the horn, or the player may be seated and the horn brought into the same playing position it occupied before the player left the seated position.

A tilting mechanism enables the horn to be moved arcuately about a horizontal axis so the horn will occupy the proper position and when once adjusted to a particular performer, need not be readjusted.

PRIOR ART

Investigation of the prior art did not result in any counterbalanced parallelogram mechanism to support a horn for movement in a vertical plane being located. The following patents are noted for information: U.S. Pat. Nos. 2,575,540; 3,193,325; 3,259,428.

OBJECTS OF THE INVENTION

An object of this invention is to provide a demountable instrument stand which is so constructed as to enable the instrument to be adjusted to a particular player, so the instrument can be used without the player having to lift and hold the instrument.

Another object is to provide a support stand for a musical instrument which will enable the instrument to be raised and lowered in a vertical plane to enable the instrument to be brought back to the same position, whether around the player or in front of the player, each time it is lowered and allows the instrument to be raised sufficiently to enable the player to leave the seat without being constrained within the convolutions of the horn.

A further object of the invention is to provide a counter-balanced parallelogram mechanism for moving a musical instrument in substantially a vertical plane.

Still another object of the invention is to provide a demountable stand which may be readily disassembled for transportation and storage and which can be readily reassembled without the use of tools.

Yet a further object of the invention is to provide a spring tensioned counterbalancing mechanism to equalize the weight of the instrument so a small child can move the instrument to any position.

Yet another object of the invention is to provide an adjustment means so that a musical instrument may be rotated about a horizontal axis to enable the instrument to be properly positioned.

Still a further object of the invention is to provide horn engaging rests on which a horn may be seated to be supported thereby and on which the horn may be mounted without the use of accessory straps or clamps.

BRIEF DESCRIPTION OF THE DRAWINGS

FIG. 2 is an enlarged elevational view taken substantially from the side opposite that shown in FIG. 1, showing the mechanism, in full outline, in raised position, the lowered position being shown in dashed outline, with a portion of the horn being shown in dot-dash ouline;

FIG. 3 is an enlarged sectional view taken on the line 3—3 of FIG. 2, looking in the direction indicated by the arrows, showing an arcuate slot in the horizontal tubular member to enable the horizontal tubular member to be rocked about the axis thereof;

FIG. 4 is a fragmentary sectional view taken on the line 4—4 of FIG. 2, looking in the direction indicated by the arrows;

FIG. 5 is an enlarged transverse sectional view taken on the line 5—5 of FIG. 2, looking in the direction indicated by the arrows, showing a transverse arcuate recess to limit the arcuate movement of the upright standard;

FIG. 6 is a sectional view taken on the line 6—6 of FIG. 2, looking in the direction indicated by the arrows;

FIG. 7 is a perspective view of the instrument stand as shown in FIG. 1, with parts enlarged and with parts broken away and shortened, the horn not being positioned thereon to better show the details of construction, the mechanism being shown in raised position, the base and upright standard being shown in exploded relation, on a smaller scale;

FIG. 8 is a sectional view taken on the line 8—8 of FIG. 7, looking in the direction by the arrows;

FIG. 9 is a modified form of the invention, showing an attachment hereto to enable the use of the instrument stand with a tuba horn, the perspective being taken from the side opposite that being shown in FIG. 1, and showing the horn positioned within the support member therefor and showing a player seated in position to play the tuba horn;

FIG. 10 is a perspective view taken from the top and a side of the attachment for supporting a tuba horn, and showing the manner by which it is clamped to the horn support member shown in FIG. 1.

FIG. 11 is a sectional view taken on the line 11—11 of FIG. 10, looking in the direction indicated by the arrows, showing the manner of the tuba horn attachment support member to an outwardly extending arm of the instrument stand, and showing a threaded adjustment support connected thereto.

DESCRIPTION

Figure 1:
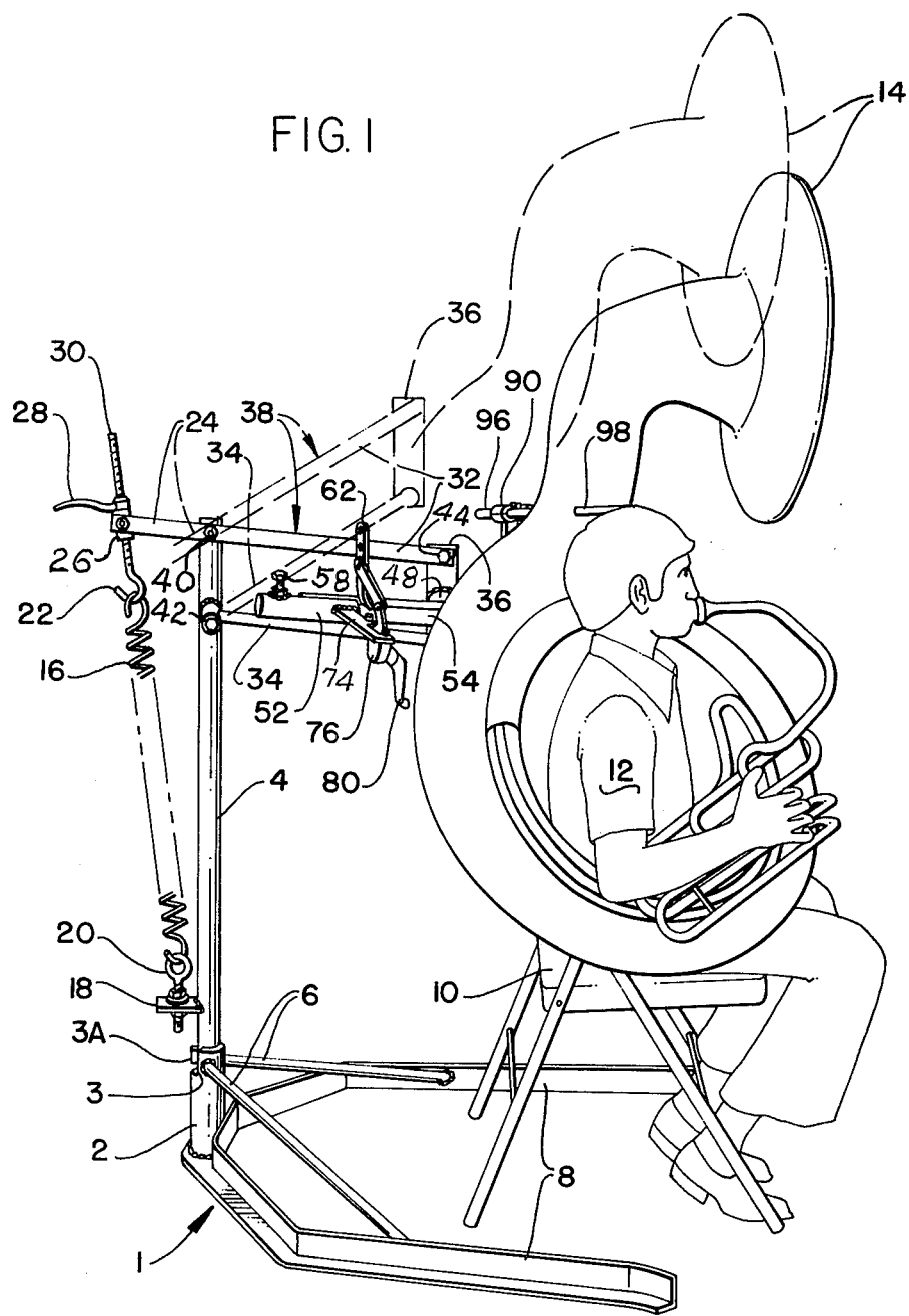
FIG. 1 is a perspective view of the instrument stand, particularly showing a side, the rear and top thereof, and showing a spring balanced parallelogram mechanism for raising and lowering the instrument, also showing an individual seated in position to play the sousaphone horn, in full outline, the raised position of the sousaphone horn being shown in dashed outline, to enable the player to readily move from the seat without being constrained by the horn.

With more detailed reference to the drawing, in which like reference characters designate like parts in the several views thereof, with the numeral 1 designating generally a bifurcated base having a bight portion to which an upstanding tubular member is affixed to form a socket 2 to receive an upright tubular support member or standard 4. The socket 2 has a cut-away arcuate recessed portion 3 in the upper end thereof to receive an outstanding lug 3A to limit the arcuate movement of the upright standard within a predetermined degree to prevent the stand being overturned, yet enable a limited arcuate movement of upright standard 4 about the major axis thereof. The socket 2 has angulated braces 6 secured to the upper portion thereof, which extend outwardly and are secured to legs 8 of the bifurcated stand 1. The legs 8 are spread apart sufficiently to allow a chair or other seating arrangement 10 to be placed therebetween, which chair may be used by the player of the instrument.

The form of the invention shown in FIG. 1, is a sousaphone horn 14 supported on the stand so it may be counter-balanced to move from the position shown in full outline to that shown in dashed outline by adjusting a spring 16 having a first end connected to an eye bolt 20 which is mounted in an apertured lug 18 affixed to upright standard 4, and a second end connected to a hook 22 so as to exert tension on outwardly extending levers 24 to which hook 22 is connected by a swivel block pivot member 26 and a threaded bolt 30 mounted between levers 24. A threaded lever 28 threadedly engages the screw threaded bolt 30 and may be turned to exert pressure on outwardly extending levers 24, each of which is a portion of pivoted bars 32, which, with pivoted bars 34 and upright bar 36 form a parallelogram mechanism 38. The first ends of bars 32 and 34 are connected to upright standard 4 by pivot bolts 40 and 42, respectively, and the second ends of bars 32 and 34 are connected to bar 36 by tubular support member 4, and pivot bolts 44 and 46 to 36 form the parallelogram mechanism the horn, or other musical instrument 14, when attached to the parallelogram mechanism 38 by musical instrument support member 54, which is preferably a round tubular member, will enable the musical instrument to be seated on a musical instrument engaging bracket, so as to be raised and lowered in a vertical plane without lateral movement.

The bar 36 has a laterally extending tubular member 48 secured thereto and to a bar 50, as by welding, which bar 50 extends rearwardly and has a horizontal member 52, FIGS. 2, 3, 6, 7 and 8 secured thereto, as by welding. A tubular member or shaft 54 is journaled within horizontal tubular member 52, as will best be seen in FIGS. 2, 3, 6, 7 and 8, which tubular member or shaft 54 has an arcuate slot 56 formed therein, as will best be seen in FIG. 3, which slot receives a bolt 58, which bolt limits the arcuate movement of tubular member 54 with respect to tubular member 52. A nut 60 is preferably welded to tubular member 52 to enable the bolt 58 to be screw threaded therethrough and through arcuate slot 56 in tubular member 54, which enables limited relative movement between the tubular members, and also prevents accidental separation of the tubular members.

The tubular member 54 has an upstanding lever 62 secured thereto, as by welding, which lever has apertures 64 near the upper end thereof to selectively receive a pin 66 therethrough and through a linkage 68, which linkage is apertured and pivotally connects to apertured crank operated lever 70 by a pivot pin 72 passing through the aperture in the linkage and through the aperture in the lever. An outstanding bar 74 is secured to tubular member 52, as by welding, and has a gear mechanism 76 mounted thereon by bolts 78, so upon turning crank 80 the lever 70 may be made to move arcuately, which in turn, rotates tubular member 54 arcuately in a selected direction, the desired degree.

Adjustable horn support bracket 82 having an upright axis, is mounted on bolt 83, passing through the aperture in the flattened outer end 55 of tubular member 54 and through inwardly extending apertured portion 81 of bracket 82, which enables the swinging of outwardly facing hook bracket 82 about the upright axis of bolt 83. Also mounted on bolt 83 is an apertured angle bracket 84, the aperture of which bracket receives the bolt 83 for movement about the axis thereof. The upper end of the angle bracket 84 has an apertured inturned portion 86 which has a bolt 88 passing therethrough and through an apertured clamp 90. The clamp 90 has arcuate clamp portions 91 and 94 therein. A bar 96 extends through one of the arcuate clamp portions 92 or 94 and is adjustable longitudinally or arcuately in either of the clamp portions 92 or 94, which bar has a hook portion 98 thereon to engage a sousaphone or other horn, so upon proper positioning of the bar 96 and hook 98 in clamp 90, the bolt 88 may be tightened to maintain the hook 98 in the proper adjusted position.

The outwardly facing bracket 82 is adapted to receive one portion of the sousaphone or other horn within an arcuate portion thereof and the hook 98 is adapted to engage, in opposed relation, with another portion of the sousaphone or other horn so the weight of the horn will be maintained in stable condition without the use of straps, clamps or the like, so it may be readily removed from the brackets. The sousaphone or other horn is so adjusted that the player may be seated in a chair and the instrument moved downward into position so that the mouthpiece of the instrument is in proper relationship to the lips of the player, by spring tensioned counterbalancing of the parallelogram mechanism 38, so that the sousaphone or other horn will move in a vertical path. When once adjusted to a particular player, when seated, the instrument may be moved upwardly and returned to playing position, without requiring further adjustments.

With the parallelogram arrangement 38, which is spring tensioned by spring 16 to balance the weight of the instrument 14, the horn can be raised or lowered in a vertical plane, by a student who is not large enough or strong enough to lift the instrument, therefore young student musicians are able to adjust the instrument to their needs, and will be able to practice on and play certain instruments at a much earlier age than would otherwise be possible.

MODIFIED FORM OF THE INVENTION

A modified form of the invention is shown in FIGS. 9 through 11, which form utilizes the basic portions of the aforementioned form of the invention, including the bifurcated base 1 having the upright tubular socket 2 thereon to receive an upright tubular support member therein.

Near the upper end of the upright tubular support member is a parallelogram mechanism 38, which mechanism has an outwardly extending lever 24 thereon, so that the parallelogram mechanism 38 will pivot about pivot bolts 40 and 42 on upright tubular support member 4, in the manner as shown by FIGS. 1 and 9, and about the pivots 40, 42, 44 and 46, as shown in FIG. 7.

The parallelogram mechanism 38 has a pivot bar 36 attached thereto, which bar has a tubular member 48 thereon which extends laterally outward therefrom. The tubular member 48 has a horizontal bar 50 welded, or otherwise secured, thereto. The bar 50 is secured to a horizontal tubular member 52 in fixed relation with respect to upright bar 36, FIG. 8. The tubular member 54 is pivotally mounted in horizontal tubular member 52 and has a flattened outer end 55 to receive a bolt 83 through an aperture therein and through brackets 82 and 84. This much of the mechanism is common to both forms of the invention, and the same reference numerals have been applied to the same parts of both forms of the invention.

A bar 101 has clamps 102 secured to the inner end thereof, which bar is bent downward at 104 so as to clear the end of bolt 83 which passes through tubular member 54. The bar 101 has a transverse bar 106 secured to the lower side thereof, as by welding, and is apertured to receive a screw threaded bolt 108 therethrough and has nuts 110 on each side of the bar 106 to provide adjustment means for the screw threaded rod 108 to bring it into bearing relation with bar 81 which forms a portion of the bracket 82. The bar 81 is pivotally connected to the flattened portion 55 of tubular member 54. This enables the supporting of support bracket 82.

The bar 101 extends outward and is apertured near the outer end thereof to receive a bolt 112 therethrough and through a pivotally mounted tuba support bar 114. The tuba support bar 114 has inturned support hooks 116 and 118 which extend inward from the bar to support a tuba horn against lateral movement. A bar 120 extends downwardly and is bent inwardly at 122 into a hook-like contour 124 on the lower end thereof to receive the lower end of a tuba horn or the like. A bar 126 is secured to the hook portion 124 and is curved upwardly at 128 and 130 to prevent lateral movement of the lower end of the tuba horn or the like.

A tuba horn 132 may be positioned between hooks 116, 118 and 124, with the curved portions 128 and 130 centering the tuba horn so the player 134 may be seated in chair 136 and be able to move the horn into proper position for playing by the spring tensioned parallelogram mechanism 38, so that the tuba horn may be raised or lowered, due to the counter-balancing thereof, by a student too small to be able to manipulate the instrument otherwise. The player may also raise the instrument, leave his seat and return thereto and bring the instrument back into playing position without any further adjustments being required.

It is to be pointed out that the attachment, as shown in FIG. 10 may be readily adapted to the form of the invention as shown in FIGS. 1 through 8, by clamping clamps 102 in place on tubular member 54 by means of two bolts 138, which bolts may be removed to enable the removal of the attachment. In this manner the stand and basic elements can be used both for a sousaphone or a tuba horn, with only minor changes.

OPERATION

The demountable stand 1 has the upright tubular support member 4 separable from the legs 8, for shipment and/or storage, by merely lifting the upright tubular support standard out of the socket 2.

The tubular socket 52, as best seen in FIGS. 2, 3 and 8 is secured, as by welding, to upright bar 36 by means of bar 50, however, a bar 54, FIGS. 2, 3 and 8, is fitted within socket 52 and is restrained by bolt 58, against longitudinal movement but is permitted limited arcuate movement by turning crank 80, which will move lever 70 and linkage 68 to move the lever 62 which is secured to the tubular member 50. This will enable the musical instrument to be moved about a horizontal axis until the proper position is attained.

A bracket 82 is provided which pivotally moves about bolt 83 until the proper position against the tube of a horn 14 is attained, then bracket 84 is pivoted about bolt 83 to the proper position so that hook 98 may be positioned in opposed relation to support the weight of the horn and prevent it moving outwardly. The hook 98 has a rod portion 96 thereon which is clamped within clamp 90, so upon tightening bolt 88 the hook can be held in the proper position, in adjusted relation for a particular horn and a particular individual.

With the universal adjustment provided by the two brackets and with the clamp and hook arrangement, practically any type of sousaphone or the like can be accomodated, so when the horn is placed in the bracket 82, and leaned against the hook 98, it will remain in place until manually removed, and once adjusted to a particular horn, the horn may be removed and replaced very quickly, with no further adjustments being required.

TUBA HORN SUPPORT

The support stand, as hereinbefore described can readily be adapted for use with a tuba horn by clamping bar 101 onto horizontal tubular member 54 by means of clamps 102, which are secured to the bar 101 as by welding, which clamps are secured to the tubular member 54 by means of bolts 138, as will best be seen in FIGS. 10 and 11. The bar 101 is apertured so as to enable the apertured bar 114 to swing about the axis of bolt 112 so when the tuba horn is seated between hooks 116, 118 and 124 it may be adjusted to the proper position, and by turning the crank 80, it may be further adjusted with respect to the vertical.

What is claimed is:

1. A stand comprising:
    a bifurcated base having a pair of spaced-apart legs and a bight portion;
    an upstanding tubular member having a lower end affixed to said bight portion, said tubular member also having an upper end and a major axis, said major axis extending from said lower end to said upper end;
    an upright standard having a lower end rotatably coupled to said tubular member, said upright standard also having an upper end and a major axis, said major axis of said upright standard lying in a substantially vertical plane coinciding with the plane in which said major axis of said tubular member lies;
    a parallelogram mechanism including an upper bar and a lower bar, each of said bars having a first end, a second end and a major axis, the major axis of each of said bars extending from its first end to its second end, said parallelogram mechanism also including first means pivotally connecting said first end of said upper bar to said upright standard adjacent its upper end for rotation about a substantially horizontal axis, second means pivotally connecting said first end of said lower bar to said upright standard in the same vertical plane as, and a first predetermined distance below, said first end of said upper bar for rotation about a substantially horizontal axis and an upright bar having an upper end pivotally connected to said second end of said upper bar and a lower end pivotally connected to said second end of said lower bar, said upright bar having a major axis extending from its upper end to its lower end and being of a second predetermined length substantially equaling said first predetermined length, whereby said upright bar will remain substantially parallel to said upright standard during pivoting movements of said first ends of said upper and lower bars;

a shaft having a major axis;

means rotatably coupling said shaft to said upright bar in a manner such that said major axis lies in a horizontal plane, said shaft being rotatable about said major axis;

means coacting with said shaft for limiting rotation thereof to a small, predetermined arc;

means affixed to said shaft for supporting a predetermined load;

means connected to said parallelogram mechanism for at least partially counterbalancing said predetermined load; and means coacting with said upright standard for limiting the rotation thereof in a manner such that the position of said load with respect to the position of each of said legs on said base remains such that said load will not upset said base regardless of the rotated position of said standard.

2. A stand as stated in claim 1 wherein said means rotatably coupling said shaft to said upright bar comprises:

a horizontal bar having first and second ends;

a horizontal tubular member;

first means affixing said first end of said horizontal bar to said upright bar; and second means affixing said second end of said horizontal bar to said horizontal tubular member, said shaft being rotatably mounted in said horizontal tubular member.

3. A stand as stated in claim 2 wherein said means coacting with said shaft for limiting rotation thereof comprises:

an arcuate slot in said shaft; and a bolt affixed to said horizontal tubular member, said bolt extending into said arcuate slot.

4. A stand as stated in claim 3 including:

a crank affixed to said horizontal tubular member;

an upstanding lever affixed to said shaft; and a link connecting said crank to said upstanding lever, whereby the rotated position of said shaft may be controlled by said crank.

5. A stand as stated in claim 1 wherein said means affixed to said shaft for supporting a predetermined load comprises:

an outwardly-facing hook bracket adapted to engage one side portion of a Sousaphone; and an inwardly facing hook adapted to engage another, opposite side portion of said Sousaphone.

6. A stand as stated in claim 1 wherein said means affixed to said shaft for supporting a predetermined load comprises:

a first bar having one end connected to said shaft, said first bar having a second end;

a second bar having first and second ends;

a bolt pivotally connecting said second end of said first bar to said first end of said second bar;

a first inturned hook affixed to said second end of said second bar;

a second inturned hook affixed to said second bar adjacent its first end;

a third bar depending from said second bar intermediate said first and second inturned hooks, said third bar having an upturned hook at its lower end; and an upwardly-curved fourth bar affixed to said upturned hook, said first and second inturned hooks, said upturned hook and said upwardly-curved fourth bar forming a cradle adapted to support a tuba.

7. A stand as stated in claim 1 wherein said counterbalancing means is adjustable to compensate for loads having different weights.

8. A stand as stated in claim 1 wherein said counterbalancing means comprises:

a spring having first and second ends;

a first eye bolt connecting said first end of said spring to said upright standard; and a second eye bolt connecting said second end of said spring to said parallelogram mechanism, at least one of said eye bolts being adjustable for controlling the force exerted by said spring.

9. A stand as stated in claim 1 wherein said means coacting with said upright standard for limiting the rotation thereof comprises:

a cut-away arcuate recess provided in said upper end of said upstanding tubular member; and a lug provided on said upright standard adjacent its lower end, said lug extending into said arcuate recess.

* * * * *